(12) United States Patent
Andrejuk

(10) Patent No.: US 11,015,912 B2
(45) Date of Patent: May 25, 2021

(54) SYSTEM FOR MONITORING SEEDBED FLOOR CONDITIONS AND RELATED METHODS

(71) Applicant: CNH Industrial America LLC, New Holland, PA (US)

(72) Inventor: Nicholas Nahuel Andrejuk, Normal, IL (US)

(73) Assignee: CNH Industrial America LLC, New Holland, PA (US)

( * ) Notice: Subject to any disclaimer, the term of this patent is extended or adjusted under 35 U.S.C. 154(b) by 238 days.

(21) Appl. No.: 16/197,993

(22) Filed: Nov. 21, 2018

(65) Prior Publication Data

US 2020/0158486 A1 May 21, 2020

(51) Int. Cl.
*G01B 5/20* (2006.01)
*A01B 76/00* (2006.01)
*A01B 79/00* (2006.01)

(52) U.S. Cl.
CPC ............ *G01B 5/20* (2013.01); *A01B 76/00* (2013.01); *A01B 79/005* (2013.01)

(58) Field of Classification Search
CPC ... G01B 5/20; G01B 5/18; G01B 7/28; G01B 7/26; A01B 79/00; A01B 79/005
USPC .................. 33/521, 1 H, 836, 624
See application file for complete search history.

(56) References Cited

U.S. PATENT DOCUMENTS

| | | | | |
|---|---|---|---|---|
| 4,858,329 A | * | 8/1989 | Manor | G01B 7/28 33/775 |
| 5,107,598 A | * | 4/1992 | Woznow | G01C 7/04 33/521 |
| 5,255,561 A | * | 10/1993 | Fleming | G01B 7/345 33/1 H |

(Continued)

FOREIGN PATENT DOCUMENTS

| EP | 2944170 | 11/2015 |
|---|---|---|
| GB | 2126062 | 3/1984 |

(Continued)

OTHER PUBLICATIONS

Sutton Ag —Stanhay Precision Belt Planter, Aluminum Robin Push Planter, retrieved Nov. 12, 2018, 4 pages http://www.suttonag.com/stanhay.html.

(Continued)

*Primary Examiner* — Christopher W Fulton
(74) *Attorney, Agent, or Firm* — Rebecca L. Henkel; Rickard K. DeMille

(57) ABSTRACT

In one aspect, a system for monitoring seedbed floor conditions within a field may include a frame and a wheel coupled to the frame. The wheel may be configured to support the frame relative to a soil surface of the field as the frame is moved across the field. The system may also include a support arm pivotably coupled to the frame and a disc coupled to the support arm, with the disc configured to penetrate the soil surface of the field and roll relative to a seedbed floor within the field. Furthermore, the system may include a sensor configured to detect pivotable motion of the (Continued)

support arm relative to the frame. As such, the pivotable motion of the support arm may be indicative of variations in a profile of the seedbed floor as the ground engaging assembly is moved across the field.

19 Claims, 4 Drawing Sheets

(56) References Cited

U.S. PATENT DOCUMENTS

| | | | | |
|---|---|---|---|---|
| 5,479,992 | A * | 1/1996 | Bassett | A01B 63/114 111/134 |
| 6,701,857 | B1 * | 3/2004 | Jensen | A01B 63/32 111/200 |
| 6,782,631 | B1 * | 8/2004 | Face, III | G01C 7/04 33/501.02 |
| 6,834,550 | B2 | 12/2004 | Upadhyaya et al. | |
| 8,909,436 | B2 | 12/2014 | Achen et al. | |
| 9,265,192 | B2 | 2/2016 | Chan et al. | |
| 9,693,496 | B2 | 7/2017 | Tevs et al. | |
| 2002/0073566 | A1 * | 6/2002 | Suzuki | E01C 23/01 33/521 |
| 2003/0145477 | A1 * | 8/2003 | Fukuhara | G01C 7/04 33/521 |
| 2004/0055171 | A1 * | 3/2004 | Toom | G01C 7/04 33/533 |
| 2004/0158403 | A1 | 8/2004 | Dabas et al. | |
| 2015/0198440 | A1 * | 7/2015 | Pearlman | G01S 17/86 356/4.01 |
| 2017/0094889 | A1 | 4/2017 | Garner et al. | |
| 2018/0206393 | A1 | 7/2018 | Stoller et al. | |
| 2018/0238823 | A1 * | 8/2018 | Puhalla | G01N 27/221 |
| 2018/0279543 | A1 | 10/2018 | Kovach | |
| 2019/0075710 | A1 * | 3/2019 | Strnad | A01B 49/06 |
| 2019/0150350 | A1 * | 5/2019 | Engel | A01B 63/008 |

FOREIGN PATENT DOCUMENTS

| | | |
|---|---|---|
| WO | WO 2015169323 | 11/2015 |
| WO | WO 2017143121 | 8/2017 |

OTHER PUBLICATIONS

Zagroda L. Czuchaj, Hand Sower, retrieved on Oct. 18, 2018, 1 page http://www.agriculture-xprt.com/products/hand-sower-316873.

Hoss Garden Seeder, Garden Seeder—Hoss Tools Making Planting Easy USA Made, retrieved Oct. 18, 2018, 5 pages. http://hosstools.com/product/hoss-garden-seeder/.

Kirkegaard Nielsen et al., Seed drill instrumentation for spatial coulter depth measurements, , retrieved Oct. 17, 2018, 7 page http://dialog.proquest.com/professional/docview/1970955062/165DE26691422F43330/2?accountid=157282.

* cited by examiner

SYSTEM FOR MONITORING SEEDBED FLOOR CONDITIONS AND RELATED METHODS

FIELD OF THE INVENTION

The present disclosure generally relates to systems for monitoring seedbed floor conditions and, more particularly, to systems for detecting a profile of a seedbed floor within a field before or after the performance of an agricultural operation and related methods.

BACKGROUND OF THE INVENTION

It is well known that, to attain the best agricultural performance from a piece of land, a farmer must cultivate the soil, typically through a tillage operation. Common tillage operations include plowing, harrowing, and subsoiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

When performing a tillage operation, it is desirable to create a level and uniform layer of tilled soil across the field to form a proper seedbed for subsequent planting operations. However, due to varying soil conditions across the field and/or other factors, the levelness and/or uniformity of the seedbed floor may be impacted significantly. Such poor seedbed conditions can result in a subsequent loss in the crop yield, such as due to poor germination and/or non-uniform plant stands. In this regard, attempts have been made to develop systems to monitor the condition of the seedbed created during a tillage operation. However, to date, such systems have failed to provide an effective and simple system or device that a farmer may use to check the profile of the seedbed floor before or after the performance of a tillage operation.

Accordingly, an improved system for monitoring seedbed floor conditions and related methods would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring seedbed floor conditions within a field. The system may include a frame and a wheel coupled to the frame, with the wheel configured to support the frame relative to a soil surface of the field as the frame is moved across the field. The system may also include a support arm pivotably coupled to the frame and a disc coupled to the support arm, with the disc configured to penetrate the soil surface of the field and roll relative to a seedbed floor within the field. Furthermore, the system may include a sensor configured to detect pivotable motion of the support arm relative to the frame. As such, the pivotable motion of the support arm may be indicative of variations in a profile of the seedbed floor as the ground engaging assembly is moved across the field.

In another aspect, the present subject matter is directed to a seedbed floor monitoring device. The device may include a frame extending along a lateral direction between a first side and a second side. The device may also include first and second wheels coupled to the frame and configured to support the frame relative to a soil surface of the field as the frame is moved across the field. Furthermore, the device may include a disc pivotably coupled to the frame and positioned between the first and second wheels along the lateral direction, with the disc configured to penetrate the soil surface of the field and roll relative to a seedbed floor within a field as the device is moved across the field. Moreover, the device may include a handle coupled to the frame, with the handle configured to permit an operator to move the device across the field in a direction of travel. Additionally, the device may include a sensor configured to detect pivotable motion of the disc relative to the frame and a controller communicatively coupled to the sensor, with the controller configured to monitor the profile of the seedbed floor as the device is moved across the field based on data received from the sensor.

In a further aspect, the present subject matter is directed to a method of adjusting implement operating parameters based on seedbed floor conditions within a field. The method may include moving an agricultural implement across the field to perform an agricultural operation on a swath of the field. The method may also include moving a seedbed floor monitoring device across the swath of the field. The device may include a frame and a wheel coupled to the frame, with the wheel configured to support the frame relative to a soil surface of the field as the frame is moved across the field. The device may also include a support arm pivotably coupled to the frame and a disc coupled to the support arm, with the disc configured to penetrate the soil surface of the field and roll relative to a seedbed floor within the field. Furthermore, the device may include a sensor configured to detect pivotable motion of the support arm relative to the frame and a controller configured to generate a profile of the seedbed floor based on data received from the sensor. Additionally, the method may include adjusting an operating parameter of the agricultural implement based on the generated profile of the seedbed floor.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
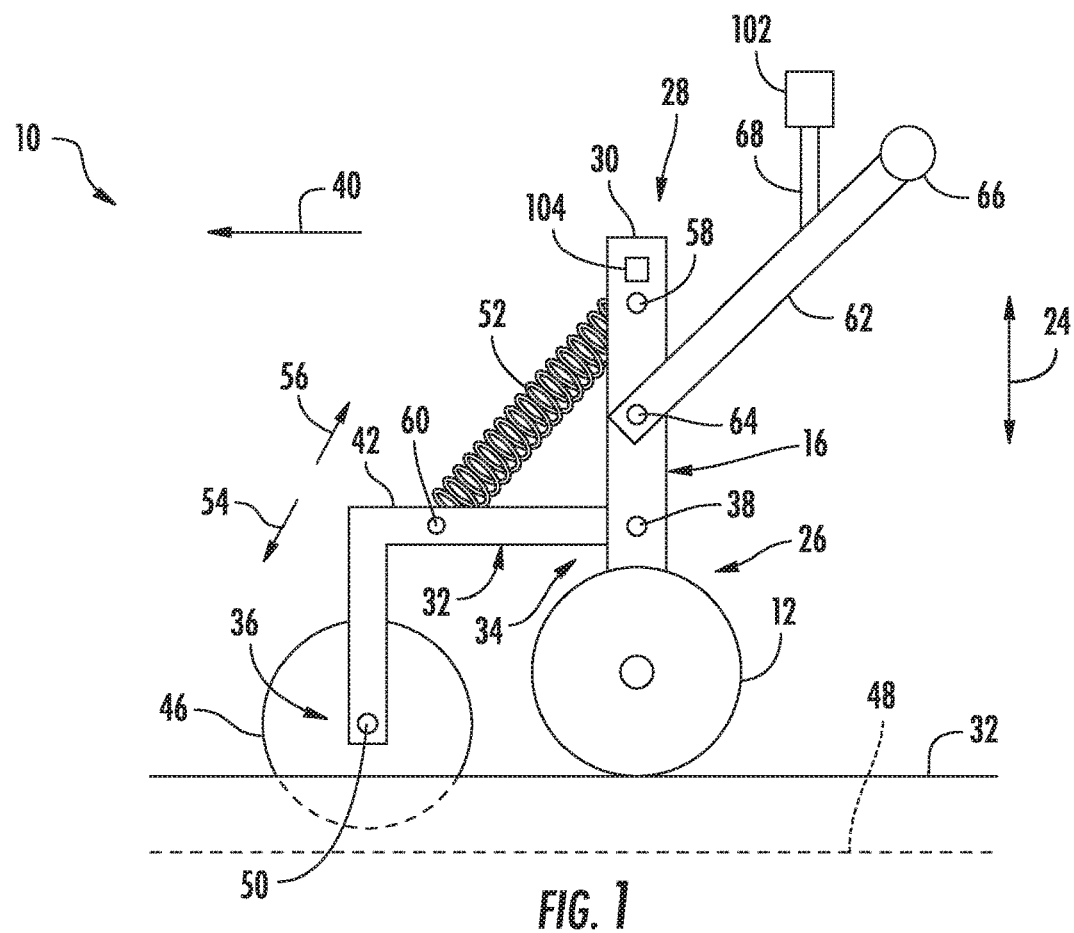
FIG. 1 illustrates a side view of one embodiment of a seedbed floor monitoring device in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for monitoring seedbed floor conditions and related methods. Specifically, in several embodiments, the system may include one or more components that permit variations in the profile of the seedbed floor to be detected. For example, in one embodiment, the system may include a frame and first and second wheels configured to support the frame relative to the soil surface of the field. Furthermore, the system may include a support arm having a first end pivotably coupled to the frame and a second end coupled to a disc or coulter. A spring or other biasing member of the system may be configured to bias the disc away from the frame such that the disc penetrates the soil surface of the field. In this regard, when the system moves across the field, the disc may roll relative to the seedbed floor of the field. As the profile of the seedbed floor changes, the disc may move up and down in a manner that causes the support arm to pivot relative to the frame. Additionally, the system may include a sensor configured to detect the pivotable motion of the support arm relative to the frame and a controller configured to monitor the profile of the seedbed floor based on data received from the sensor.

It should be appreciated that the disclosed system may be configured as a seedbed floor monitoring device. In several embodiments, the device may be configured to be manually moved across a swath of the field by an operator. As such, the device may include a handle that is coupled to the frame and configured to permit the operator to push the device across the swath. For example, in certain instances, the operator may push the device across a swath of the field before performing a tillage or other field operation on the swath to determine the pre-tillage seedbed floor profile. Based on the determined profile, the operator may adjust one or more operating parameters of an implement (e.g., the penetration depth(s) of and/or the downforce being applied to the associated ground engaging tool(s)) that will be used to perform the tillage operation. Conversely, in other instances, the operator may push the device across the swath of the field upon completion of the tillage operation to determine the post-tillage seedbed floor profile. Thereafter, based on the determined profile, the operator may, if necessary, rework the swath of the field or adjust the operating parameter(s) of the implement before performing the tillage operation on another swath of the field.

Figure 2:
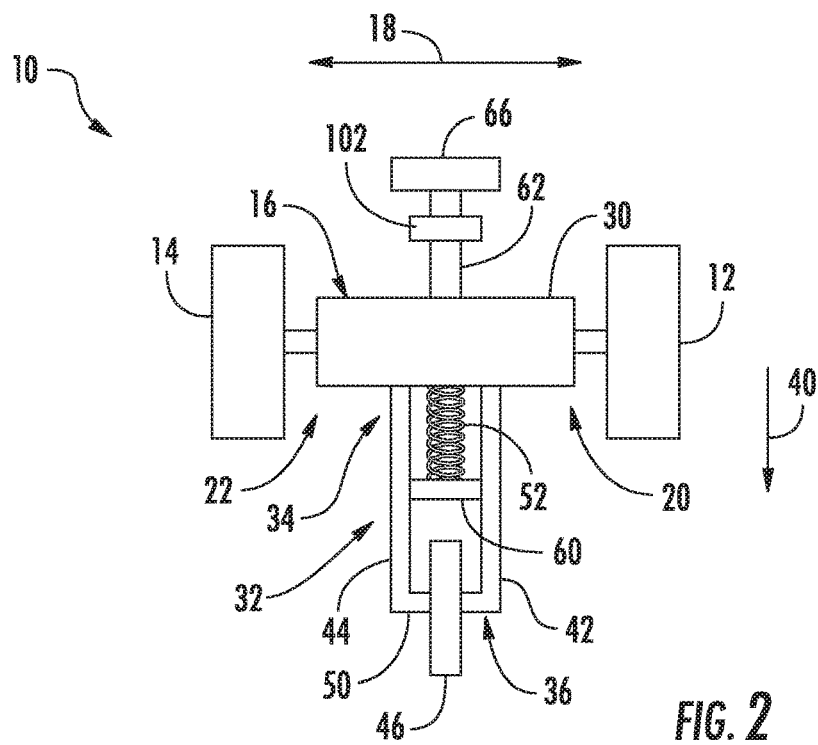
FIG. 2 illustrates a top view of the seedbed floor monitoring device shown in FIG. 1, particularly illustrating the device including first and second wheels in accordance with aspects of the present subject matter.

Referring now to the drawings, FIGS. 1 and 2 illustrate differing perspective views of one embodiment of a seedbed floor monitoring device 10 in accordance with aspects of the present subject matter. Specifically, FIG. 1 illustrates a side view of the device 10. Additionally, FIG. 2 illustrates a top view of the device 10, particularly illustrating first and second wheels 12, 14 of the device 10.

As shown in FIGS. 1 and 2, the device 10 may include a frame 16. More specifically, the frame 16 may extend along a lateral direction 18 between a first side 20 and a second side 22. The frame 16 may also extend along a vertical direction 24 between a bottom end 26 and a top end 28. In this respect, the frame 16 may generally include a plurality of structural frame members 30, such as beams, bars, and/or the like, configured to support or couple to a plurality of components.

In several embodiments, the device 10 may include one or more wheels coupled to the frame 16. As such, when the device 10 is moved across a field, the wheel(s) may be configured to roll along a soil surface (e.g., as indicated by line 32 in FIG. 1) of the field in a manner that supports the frame 16 relative to the soil surface 32. For example, as shown in FIG. 2, in one embodiment, the device 10 may include a first wheel 12 rotatably coupled to the first side 20 of the frame 16 and a second wheel 14 rotatably coupled to the second side 22 of the frame 16. Thus, the first and second wheels 12, 14 may be spaced apart from each other along the lateral direction 18. However, in alternative embodiments, the device 10 may include any other suitable number of wheels, such as one wheel or three or more wheels.

Furthermore, the device 10 may include a support arm 32 that is pivotably coupled to the frame 16. Specifically, in several embodiments, the support arm may extend between a first end 34 and a second end 36. In such embodiments, the first end 34 of the support arm 32 may be pivotably coupled to the frame 16 at a pivot joint 38, while the second end 36 of the support arm 32 may be positioned forward of the frame 16 relative to a direction of travel (e.g., as indicated by arrow 40 in FIG. 1) of the device 10. Moreover, in the illustrated embodiment, the support arm 32 may include first and second support arm members 42, 44 that are spaced apart from each other along the lateral direction 18. Each of the support arm members 42, 44 may, in turn, define an L-shaped configuration. However, in alternative embodiments, the support arm 32 may include any suitable number of support arm members, such as one support arm member or three or more support arm members. Additionally, it should be appreciated that each support arm member may define any other suitable configuration or shape, such as an arcuate shape.

Moreover, in several embodiments, the device 10 may include a disc or coulter 46 rotatably coupled to the support arm 32. In this regard, when the device 10 is moved across the field, the disc 46 may be configured to penetrate the soil surface 32 of the field and roll along a seedbed floor (e.g., as indicated by dashed line 48 in FIG. 1) of the field. As such, the disc 46 may move up and down along the vertical direction 24 as the profile of the seedbed floor 48 varies, thereby causing the support arm 32 to pivot relative to the frame 16. The pivotable movement of the support arm 32 relative to the frame 16 may, in turn, be used to determine or monitor the profile of the seedbed floor of the field. Furthermore, in one embodiment, the disc 46 may be mounted on an axle 50 that extends laterally between the first and second support arm members 42, 44. Thus, in such embodiment, the disc 46 may be positioned between the support arm members 42, 44 along the lateral direction 18. However, in alternative embodiments, the disc 46 may be coupled to the support arm 32 in any other suitable manner. Additionally, in alternative embodiments, the device 10 may include any other suitable number of discs 46, such as two or more discs 46.

Additionally, the device 10 may include a biasing element 52 coupled between the frame 16 and the support arm 32. In general, the biasing element 52 may be configured to bias the support arm 32 away from the frame 16 such that the disc 46 penetrates the soil surface 32 and contacts the seedbed floor 48. In operation, the biasing element 52 may permit relative movement between the support arm 32 and the frame 16. For example, the biasing element 52 may be configured to bias the support arm 32 to pivot relative to the frame 16 in a first pivot direction (e.g., as indicated by arrow 54 in FIG. 1) until the disc 46 contacts the seedbed floor 48. The biasing element 52 may also allow the support arm 32 to pivot relative to the frame 16 in a second pivot direction (e.g., as indicated by arrow 56 in FIG. 1) opposite the first pivot direction 54, when depth of the seedbed floor 48 decreases (e.g., the distance between the seedbed floor 48 and the soil surface 32 decreases. As shown in FIGS. 1 and 2, the biasing element 52 may be coupled to a first shaft 58 extending laterally between a pair of frame members 30 and a second shaft 60 extending laterally between the first and second support arm members 42, 44. However, it should be appreciated that the biasing element 52 may be coupled between the frame 16 and the support arm 32 in any other suitable manner. Moreover, in the illustrated embodiment, the biasing element 52 may be configured as one or more springs. However, in alternative embodiments, the biasing element 52 may be configured as any other suitable biasing element.

Furthermore, the device 10 may include a handle 62 coupled to the frame 16. In general, the handle 62 may be configured to permit an operator of the device 10 to push or otherwise move the device 10 across a swath of the field in the direction of travel 40. That is, the operator may use the handle 62 to apply a force to the device 10 that moves the device 10 across the field. In several embodiments, the operator may provide the sole force (e.g., via the handle 62) for driving the device 10 across the field. As such, the device 10 may be neither configured to be towed across the field by a work vehicle (e.g., an agricultural tractor) nor self-propelled (e.g., by a motor, engine, and/or the like). In one embodiment, as shown in FIG. 1, the handle 62 may be pivotally coupled to the frame 16 at a pivot joint 64. In such embodiment, the position of a grip 66 of the handle 64 may be adjusted along the vertical direction 24 (e.g., by pivoting the handle 62 about the pivot joint 64) to accommodate operators of varying heights. However, in alternative embodiments, the handle 62 may have any other suitable configuration.

In one embodiment, the device 10 may also include a user interface 102. More specifically, the user interface 102 may be configured to provide feedback to the operator of the device 10. As such, the user interface 102 may include one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be mounted on a post 68 coupled to the handle 62 in a manner that permits the operator to view the user interface 102 while engaging the handle 62 (e.g., applying a force to the handle 62 to move the device 10 across the field). However, in alternative embodiments, the user interface 102 may have any suitable configuration and/or be positioned in any other suitable location on the device 10.

Additionally, as shown in FIG. 1, a location sensor 104 may be provided in operative association with the device 10. In general, the location sensor 104 may be configured to determine the exact location of the device 10 using a satellite navigation positioning system (e.g. a GPS system, a Galileo positioning system, the Global Navigation satellite system (GLONASS), the BeiDou Satellite Navigation and Positioning system, and/or the like). As such, the location determined by the location sensor 104 may be transmitted to a controller of the device 10 (e.g., in the form coordinates) and stored within the controller's memory for subsequent processing and/or analysis. In the illustrated embodiment, the location sensor 104 is installed on the frame 16 at a location adjacent to the top and 28. However, in alternative embodiments, the location sensor 104 may be installed in any other suitable location on the device 10.

Figure 3:
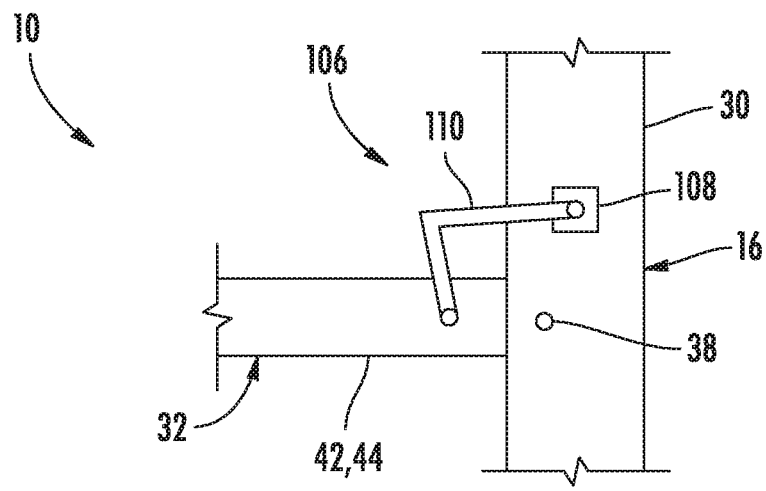
FIG. 3 illustrates an enlarged side view of one embodiment of a seedbed floor monitoring device in accordance with aspects of the present subject matter, particularly illustrating a seedbed floor sensor provided in operative association with the device.

Referring now to FIG. 3, a seedbed floor sensor 106 may be provided in operative association with the device 10. Specifically, in several embodiments, the sensor 106 may be configured to detect pivotal motion of the support arm 32 relative to the frame 16. By detecting the pivotal motion of the support arm 32 relative to the frame 16, the sensor 106 may be configured to indirectly detect variations in the vertical profile of the seedbed floor 48 (FIG. 1) as the support arm 32 pivots due to changes in the vertical positioning of the disc 46 as the disc 46 rides along the seedbed floor 48. Accordingly, the pivotal motion of the support arm 32 may be used to track variations in the vertical profile of the seedbed floor 48.

It should be appreciated that the seedbed floor sensor 106 may generally correspond to any suitable sensor or sensing device configured to directly or indirectly detect the pivotal motion of the support arm 32. In several embodiments, the seedbed floor sensor 106 may include a rotary sensor 108 (e.g., a rotary potentiometer or a magnetic rotary sensor) coupled to the frame 16 or the support arm 32 and an associated sensor linkage 110 coupled between the rotary sensor 108 and the other adjacent component. For instance, as shown in the illustrated embodiment, the rotary sensor 108 is coupled to a frame member 30 of the frame 16, with the sensor linkage 110 being coupled between the rotary sensor 108 and one of the support arm members 42, 44 of the support arm 32. As such, when the support arm 32 pivots relative to the frame 16, the motion of the support arm 32 may be detected by the rotary sensor 106 via the mechanical linkage provided by the sensor linkage 110.

In other embodiments, the seedbed floor sensor 106 may correspond to any other suitable sensor or sensing device configured to detect the pivotal motion of the support arm 32. For instance, the seedbed floor sensor 106 may correspond to a linear potentiometer, a proximity sensor, and/or any other suitable transducer (e.g., ultrasonic, electromagnetic, infrared, etc.) that allows the pivotal motion of the pivot support arm 32 to be directly or indirectly detected.

Figure 4:
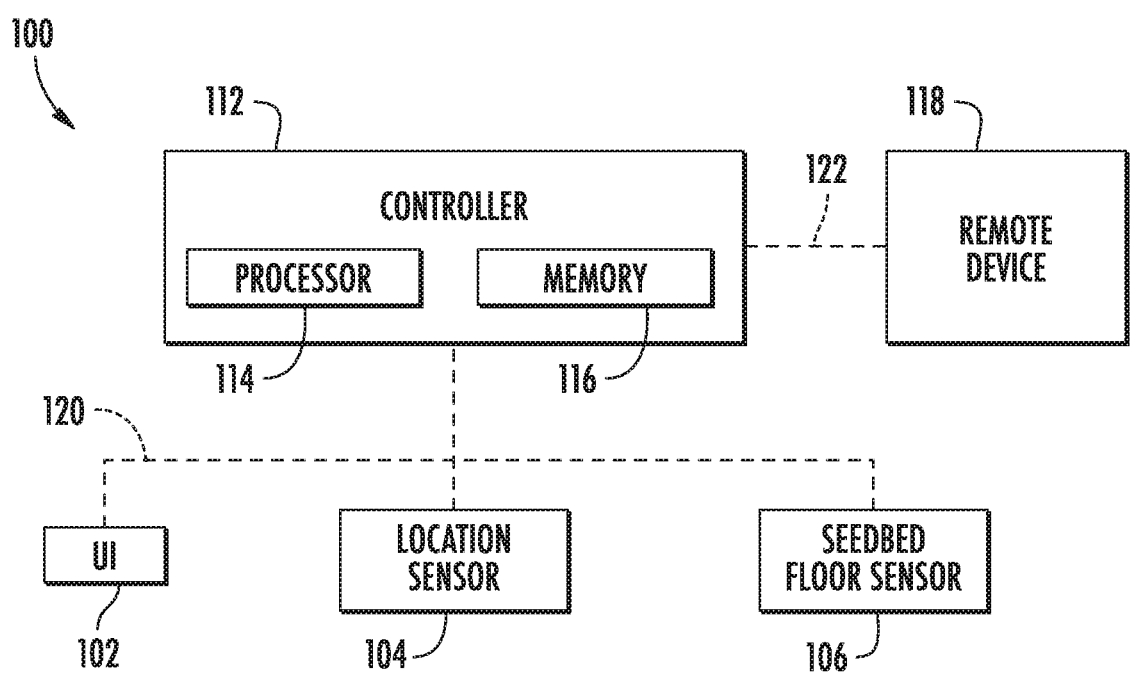
FIG. 4 illustrates a schematic view of one embodiment of a system for monitoring seedbed floor conditions in accordance with aspects of the present subject matter.

Referring now to FIG. 4, a schematic view of one embodiment of a system 100 for monitoring seedbed floor conditions is illustrated in accordance with aspects of the present subject matter. In general, the system 100 will be described herein with reference to the seedbed floor monitoring device 10 described above with reference to FIGS. 1-3. However, it should be appreciated by those of ordinary skill in the art that the disclosed system 100 may generally be utilized with seedbed floor monitoring devices having any other suitable device configuration.

As shown in FIG. 4, the system 100 may include a controller 112 positioned on and/or within or otherwise associated with the device 10. In general, the controller 112 may comprise any suitable processor-based device known in the art, such as a computing device or any suitable combination of computing devices. Thus, in several embodiments, the controller 112 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 of the controller 112 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 116 may generally be configured to store suitable computer-readable instructions that, when implemented by the processor(s) 114, configure the controller 112 to perform various computer-implemented functions.

In addition, the controller 112 may also include various other suitable components, such as a communications circuit or module, a network interface, one or more input/output channels, a data/control bus and/or the like, to allow controller 112 to be communicatively coupled to any of the various other system components described herein (e.g., the user interface 102 and/or the sensors 104, 106). For instance, as shown in FIG. 4, a communicative link or interface 120 (e.g., a data bus) may be provided between the controller 112 and the components 102, 104, 106 to allow the controller 112 to communicate with such components 102, 104, 106 via any suitable communications protocol (e.g., CANBUS).

Moreover, in several embodiments, the system 100 may include a remote device 118. As used herein, a "remote device" may be any suitable computing or display device configured to operate when physically separated or otherwise mechanically decoupled from the device 10. As such, the remote device 118 may be a personal computing device (e.g., laptop or desktop), a mobile computing device (e.g., smartphone or tablet), a wearable computing device (e.g., a smartwatch), a server, or any other suitable type of computing or display device. Furthermore, the remote device 118 may be communicatively coupled to the controller 112. For example, a communicative link or interface 122 may be provided between the controller 112 and the remote device 118 to allow the controller 112 to communicate with remote device 118 via any suitable communications protocol (e.g., Bluetooth, Near-Field Communication, Wi-Fi, infrared, and/or the like). Furthermore, in one embodiment, the user interface 102 may be incorporated within or provided as part of the remote device 118. In such embodiment, the handle 62 of the device 10 may include a docking station (not shown) on which the remote device 118 may be positioned such that the remote device 118 is able to function as the user interface 102. However, in alternative embodiments, the user interface 102 and the remote device 118 may correspond to separate stand-alone devices.

In several embodiments, the controller 112 may be configured to monitor the profile of the seedbed floor of a field across which the device 10 is being moved. Specifically, as the operator moves the device 10 across a swath of the field, the controller 112 may be configured to receive the sensor data from the seedbed floor sensor 106 (e.g., via the communicative link 120). Thereafter, the controller 112 may be configured to process/analyze the sensor data to determine the profile of the seedbed floor. For instance, the controller 112 may include a look-up table(s), suitable mathematical formula, and/or algorithms stored within its memory 116 that correlates the received sensor data to the profile of the seedbed floor. The monitored seedbed floor profile data may then be stored within the memory 116 of the controller 112, transmitted to the user interface 102 (e.g., via the communicative link 120) for displayed to the operator, and/or transmitted to the remote device 118 (e.g., via the communicative link 122) for display and/or storage on the remote device 118. In an alternative embodiment, the sensor data received by the controller 112 may be transmitted from the controller 112 to the remote device 118 (e.g., via the communicative link 122) to allow the remote device 118 to process/analyze the sensor data to determine the seedbed floor profile. In such an embodiment, the monitored seedbed floor profile data may then be stored within a memory device(s) (not shown) of the remote device 118 and/or transmitted to the user interface 102 or a second remote device (not shown).

Furthermore, in one embodiment, the controller 112 may be configured to geo-locate the monitored seedbed floor profile data within the field. More specifically, as the operator moves the device 10 along the swath of the field, the controller 112 may be configured to receive location data (e.g., coordinates) from the location sensor 104 (e.g., via the communicative link 120). Based on the known dimensional configuration and/or relative positioning between the disc 46 and the location sensor 104, the controller 112 may be configured to geo-locate each seedbed floor profile measurement within the swath of the field. For example, in one embodiment, the coordinates derived from the location sensor 104 and the seedbed floor profile measurements derived from the seedbed floor sensor 106 may both be time-stamped. In such an embodiment, the time-stamped data may allow the seedbed floor profile measurements to be matched or correlated to a corresponding set of location coordinates received or derived from the location sensor 104.

Figure 5:
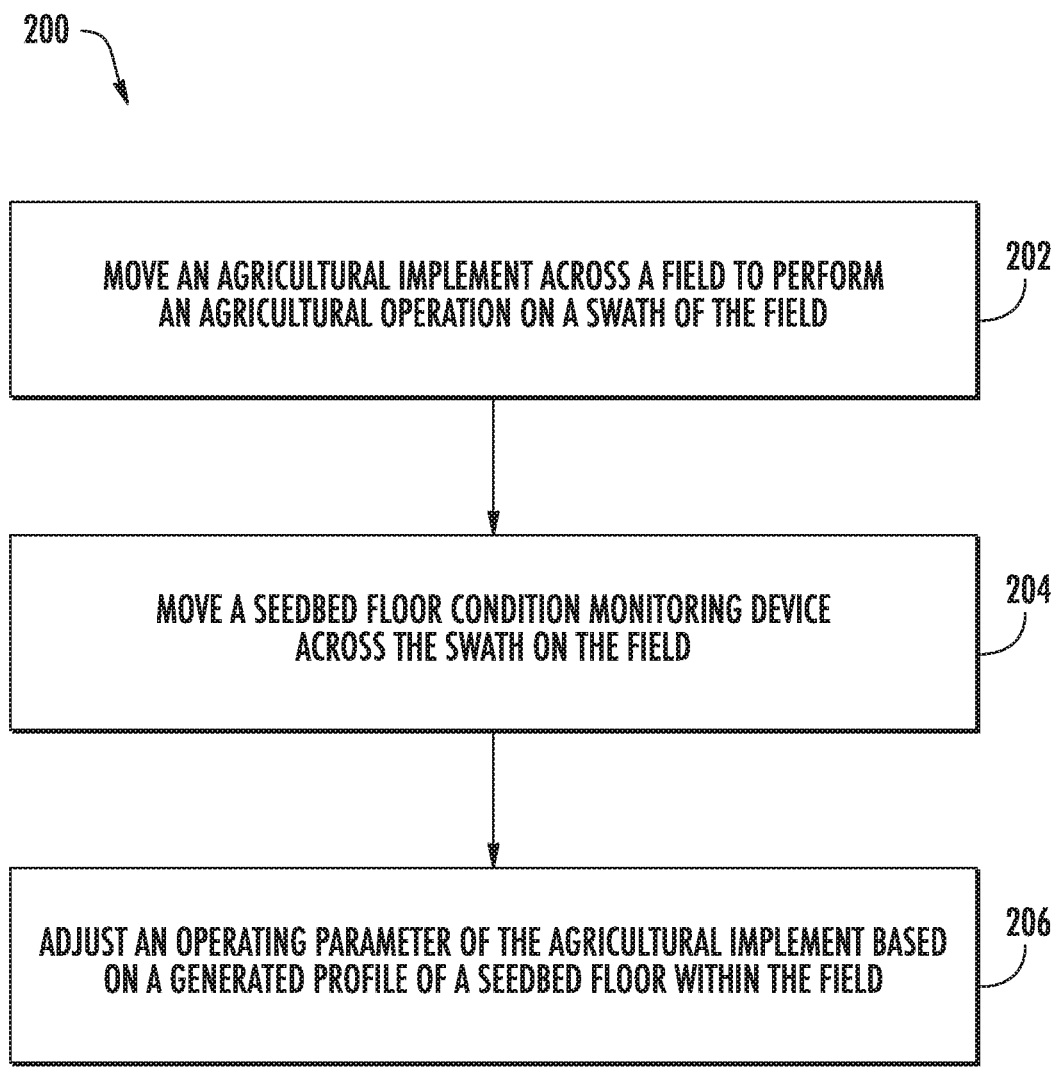
FIG. 5 illustrates a flow diagram of one embodiment of a method for adjusting implement operating parameters based on seedbed floor conditions within a field in accordance with aspects of the present subject matter.

Referring now to FIG. 5, a flow diagram of one embodiment of a method 200 for monitoring seedbed floor conditions is illustrated in accordance with aspects of the present subject matter. In general, the method 200 will be described herein with reference to the seedbed floor monitoring device 10 and the system 100 described above with reference to FIGS. 1-4. However, it should be appreciated by those of ordinary skill in the art that the disclosed method 200 may generally be implemented with any seedbed floor monitoring device having any other suitable device configuration and/or any system having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include moving an agricultural implement across a field to perform an agricultural operation on a swath of the field. For instance, an operator may move an agricultural implement (e.g., a tillage implement) across a field to perform an agricultural operation (e.g., a tillage operation) on a swath of the field.

Additionally, at (204), the method 200 may include moving a seedbed floor monitoring device across the swath of the field. For instance, the operator may move a seedbed floor monitoring device 10 across the swath of the field such that a disc 46 of the device 10 rolls along a seedbed floor of the swath. As described above, variations in the profile of the seedbed floor may cause the disc 46 to move up and down such that a support arm 32 of the device 10 upon which the disc 46 is mounted may pivot relative to a frame 16 of the device 10. A controller 112 of the device 10 may, in turn, be configured to generate a profile of the seedbed floor of the swath based on the pivotable motion of the support arm 32.

Moreover, as shown in FIG. 5, at (206), the method 200 may include adjusting an operating parameter of the agricultural implement based on the generated profile of the seedbed floor. For instance, the operator may adjust one or more operating parameters of the agricultural implement (e.g., the penetration depth of and/or the downforce being applied to one or more ground engaging tools of the implement) based on the generated profile of the seedbed floor.

Figure 6:
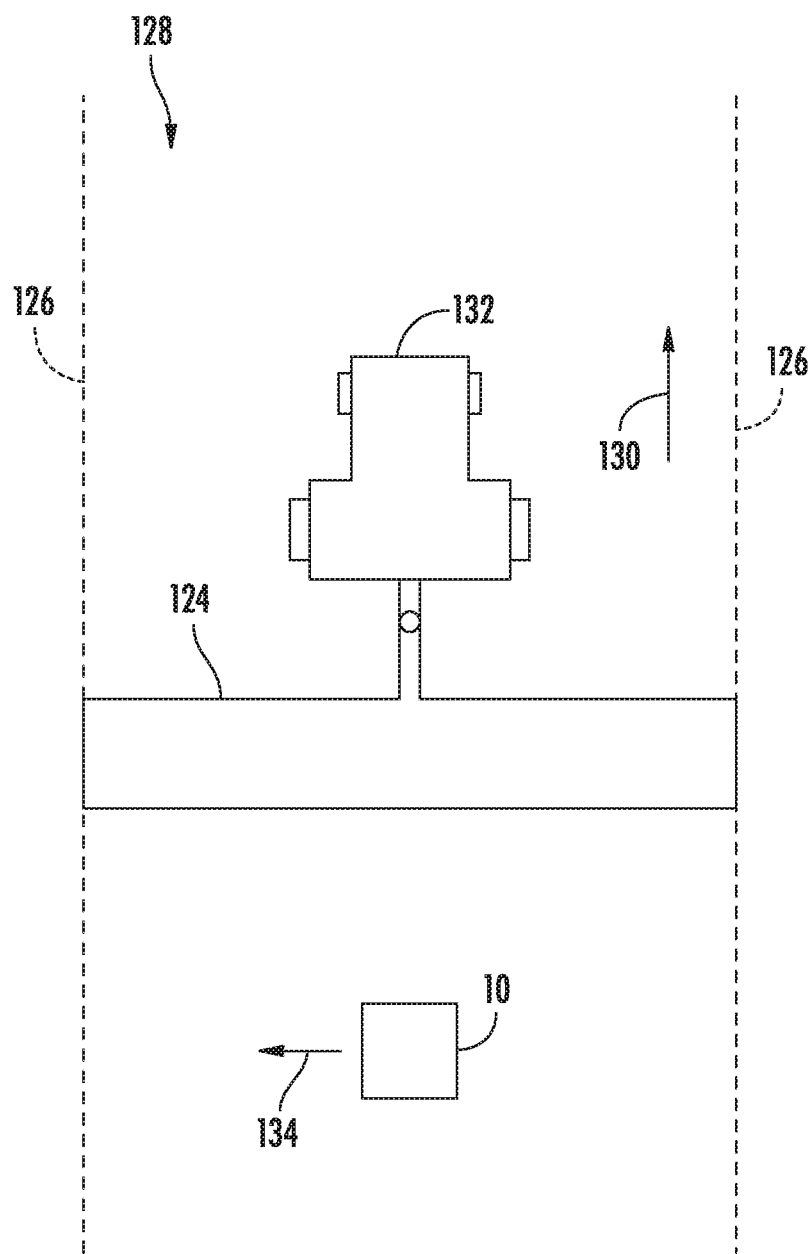
FIG. 6 illustrates a schematic view of an exemplary implementation of the method shown in FIG. 5, particularly illustrating the device being used to monitor the seedbed floor conditions following the performance of a field operation by the agricultural implement in accordance with aspects of the present subject matter.

Referring now to FIG. 6, a schematic view of an implementation of the method 200 is illustrated in accordance with aspects of the present subject matter. Specifically, as shown, the operator may tow an agricultural implement 124 across a swath (e.g., as indicated by dashed lines 126 in FIG. 6) of a field 128 in a direction of travel (e.g., as indicated by arrow 130 in FIG. 6) with the suitable work vehicle 132 (e.g., an agricultural tractor) to perform an agricultural operation on the field 128. For example, in one embodiment, the operator may tow a tillage implement (e.g., a cultivator, a ripper, disc harrow, and/or the like) along the swath 126 to perform a tillage operation on the field 128. After performing the agricultural operation on the swath 126, the operator may move the seedbed floor monitoring device 10 across the swath 126 of the field 128 in a direction of travel 134. In one embodiment, the operator may push the device 10 (e.g., via a handle 62 of the device 10) across the swath 126 such that the direction of travel 134 of the device 10 is perpendicular to the direction of travel 130 of the implement 124. As described above, device 10 may generate a profile of the seedbed floor of the swath 126 as the device 10 is moved across the swath 126. Based on the generated seedbed floor profile, the operator may adjust one or more operating parameters of the implement 124 to optimize or otherwise improve the performance and/or efficiency of the agricultural operation. For example, the operator may adjust the penetration depth of and/or downforce being applied to one or more ground engaging tools of the implement 124. Thereafter, the operator may rework the swath 126 of the field 128 or perform the agricultural operation on another swath of the field 128. However, in alternative embodiments, the operator may move the device 10 across the swath 126 of the field 128 before performing the agricultural operation on the swath 126. In such embodiments, after moving the device 10 across the swath, the operator may adjust one or more operating parameters of the implement 124 and then perform the agricultural operation on the swath 126.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring seedbed floor conditions within a field, the system comprising:
   a frame;
   a handle coupled to the frame;
   a wheel coupled to the frame and configured to support the frame relative to a soil surface of the field as the system is moved across the field;
   a support arm pivotably coupled to the frame, wherein the frame includes a vertically-extending frame member pivotably coupled to the support arm;
   a disc coupled to the support arm such that the wheel is positioned between the handle and the disc relative to a direction of travel, the disc configured to penetrate the soil surface of the field and roll relative to a seedbed floor within the field;
   a sensor configured to detect pivotable motion of the support arm relative to the frame,
   wherein the pivotable motion of the support arm is indicative of variations in a profile of the seedbed floor as the system is moved across the field; and
   a biasing element coupled between the vertically-extending frame member and the support arm, the biasing element configured to bias the support arm away from the vertically-extending frame member such that the disc contacts the seedbed floor.

2. The system of claim 1, wherein the wheel corresponds to a first wheel, the system further comprising:
   a second wheel coupled to the frame, the disc being positioned between the first and second wheels along a lateral direction of the frame, the lateral direction extending between a first side of the frame and a second side of the frame.

3. The system of claim 2, wherein the first wheel and the second wheel are positioned between the handle and the disc relative to the direction of travel.

4. The system of claim 1, wherein the sensor comprises a rotary sensor coupled to one of the support arm or the frame and a sensor linkage coupled between the rotary sensor and the other of the support arm or the frame.

5. The system of claim 1, wherein
   the handle is pivotably coupled to the frame, the handle configured to permit an operator to move the disc across the field in the direction of travel.

6. The system of claim 1, further comprising:
   a controller communicatively coupled to the sensor, the controller configured to monitor the profile of the seedbed floor based on data received from the sensor.

7. The system of claim 6, further comprising:
a location sensor configured to detect a parameter indicative of a location of the disc within the field, the controller being configured to geo-locate the monitored profile of the seedbed floor within the field.

8. A seedbed floor monitoring device, comprising:
a frame extending along a lateral direction between a first side and a second side, the lateral direction extending perpendicular to a direction of travel of the device;
first and second wheels coupled to the frame and spaced apart from each other in the lateral direction, the first and second wheels configured to support the frame relative to a soil surface of the field as the frame is moved across the field;
a handle coupled to the frame, the handle configured to permit an operator to move the device across the field in the direction of travel;
a disc pivotably coupled to the frame and positioned between the first and second wheels along the lateral direction, the disc further positioned forward of the first and second wheels and the handle relative to the direction of travel, the disc configured to penetrate the soil surface of the field and roll relative to a seedbed floor within a field as the device is moved across the field;
a sensor configured to detect pivotable motion of the disc relative to the frame; and
a controller communicatively coupled to the sensor, the controller configured to monitor the profile of the seedbed floor as the device is moved across the field based on data received from the sensor.

9. The device of claim 8, further comprising:
a support arm pivotably coupled to the frame, the support arm further coupled to the disc.

10. The device of claim 9, wherein the sensor is configured to detect pivotable motion of the disc relative to the frame by detecting pivotable motion of the support arm relative to the frame.

11. The device of claim 9, wherein the support arm comprises a first support arm member and a second support arm member spaced apart from the first support arm member in the lateral direction, the device further comprising:
an axle extending from the first support arm member to the second support arm member, the disc mounted on the axle such that the disc is positioned between the first and second support arm members in the lateral direction.

12. The device of claim 11, wherein the support arm further comprises a shaft extending between the first and second support arm members in the lateral direction such that the biasing element is coupled between the frame and the shaft.

13. The device of claim 8, wherein the sensor comprises a rotary sensor coupled to one of the support arm or the frame and a sensor linkage coupled between the rotary sensor and the other of the support arm or the frame.

14. The device of claim 8, further comprising:
a biasing element coupled between the frame and the support arm, the biasing element configured to bias the support arm away from the frame such that the disc contacts the seedbed floor.

15. The device of claim 8, further comprising:
a location sensor configured to detect a parameter indicative of a location of the disc within the field, the controller being configured to geo-locate the monitored profile of the seedbed floor within the field.

16. The device of claim 8, wherein the controller is further configured to initiate display of the monitored profile of the seedbed floor on a user interface.

17. The device of claim 8, wherein the controller is further configured to transmit data associated with the monitored profile of the seedbed floor to a remote device.

18. The device of claim 8, wherein the first wheel and the second wheel are positioned between the handle and the disc relative to the direction of travel.

19. A method of adjusting implement operating parameters based on seedbed floor conditions within a field, the method comprising:
moving an agricultural implement across the field to perform an agricultural operation on a swath of the field;
moving a seedbed floor monitoring device across the swath of the field perpendicular to a direction of travel of the agricultural implement, the device comprising a frame, a wheel coupled to the frame and configured to support the frame relative to a soil surface of the field as the frame is moved across the field, the device further comprising a support arm pivotably coupled to the frame, wherein the frame includes a vertically-extending frame member pivotably coupled to the support arm and a disc coupled to the support arm, the disc configured to penetrate the soil surface of the field and roll relative to a seedbed floor within the field, a biasing element coupled between the vertically-extending frame member and the support arm, the biasing element configured to bias the support arm away from the vertically-extending frame member such that the disc contacts the seedbed floor, the device further comprising a sensor configured to detect pivotable motion of the support arm relative to the frame and a controller configured to generate a profile of the seedbed floor based on data received from the sensor; and
adjusting an operating parameter of the agricultural implement based on the generated profile of the seedbed floor.

* * * * *